US012707117B2

(12) United States Patent
Park

(10) Patent No.: US 12,707,117 B2
(45) Date of Patent: Aug. 11, 2026

(54) ELECTRONIC DEVICE CONNECTED TO WEARABLE DEVICE, AND CONNECTION METHOD THEREFOR

(71) Applicant: SAMSUNG ELECTRONICS CO., LTD., Suwon-si (KR)

(72) Inventor: Jaesung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 19/025,017

(22) Filed: Jan. 16, 2025

(65) Prior Publication Data

US 2025/0159280 A1 May 15, 2025

Related U.S. Application Data

(63) Continuation of application No. PCT/KR2023/009579, filed on Jul. 6, 2023.

(30) Foreign Application Priority Data

Aug. 24, 2022 (KR) ........................ 10-2022-0106226

(51) Int. Cl.
*H04N 21/4363* (2011.01)
*G06F 3/0482* (2013.01)
(Continued)

(52) U.S. Cl.
CPC ..... *H04N 21/43637* (2013.01); *G06F 3/0482* (2013.01); *G06F 3/165* (2013.01); *H04N 21/41265* (2020.08)

(58) Field of Classification Search
CPC ........ G16H 40/67; G16H 40/63; G16H 50/20; A61B 5/002; A61B 5/0024;
(Continued)

(56) References Cited

U.S. PATENT DOCUMENTS

| | | | |
|---|---|---|---|
| 9,843,662 | B2 | 12/2017 | Kim et al. |
| 10,009,873 | B2 | 6/2018 | Ryu et al. |

(Continued)

FOREIGN PATENT DOCUMENTS

| | | | |
|---|---|---|---|
| EP | 3876120 | A1 | 9/2021 |
| KR | 10-2015-0123645 | A | 11/2015 |

(Continued)

OTHER PUBLICATIONS

International Search Report (PCT/ISA/210) issued by the International Searching Authority on Oct. 20, 2023 in corresponding International Application No. PCT/KR2023/009579.

(Continued)

*Primary Examiner* — Brian A Zimmerman
*Assistant Examiner* — Cal J Eustaquio
(74) *Attorney, Agent, or Firm* — Sughrue Mion, PLLC

(57) ABSTRACT

An electronic device includes: a first communication interface; a second communication interface; and one or more processors configured to: identify, based on a wearable device being detected to the one or more processors through the first communication interface, a device having a connection history with the wearable device from among at least one of one or more devices; transmit a control command to the identified device through the second communication interface, the control command comprising a command for displaying a user interface (UI) for connection with the wearable device; and control, based on a user input inputted in the UI displayed in the identified device, the first communication interface to connect to the wearable device.

20 Claims, 13 Drawing Sheets

(51) Int. Cl.
*G06F 3/16* (2006.01)
*H04N 21/41* (2011.01)

(58) Field of Classification Search
CPC ..... A61B 5/02055; A61B 5/486; A61B 5/746; A61B 5/7475; A61B 5/1112; G16Z 99/00
See application file for complete search history.

(56) References Cited

U.S. PATENT DOCUMENTS

| | | | | |
|---|---|---|---|---|
| 11,050,967 | B2 | 6/2021 | Yu et al. | |
| 12,333,203 | B2 * | 6/2025 | Kim | H04N 21/4122 |
| 2016/0105924 | A1 | 4/2016 | Baek et al. | |
| 2022/0124425 | A1 | 4/2022 | Jo et al. | |

FOREIGN PATENT DOCUMENTS

| | | | |
|---|---|---|---|
| KR | 10-2015-0135057 | A | 12/2015 |
| KR | 10-2016-0009741 | A | 1/2016 |
| KR | 10-2016-0042569 | A | 4/2016 |
| KR | 10-2017-0068138 | A | 6/2017 |
| KR | 10-1774707 | B1 | 9/2017 |
| KR | 10-2018-0057919 | A | 5/2018 |
| KR | 10-2027281 | B1 | 10/2019 |
| KR | 10-2021-0027920 | A | 3/2021 |
| KR | 10-2021-0101702 | A | 8/2021 |
| KR | 10-2339949 | B1 | 12/2021 |
| KR | 10-2352172 | B1 | 1/2022 |
| KR | 10-2022-0050610 | A | 4/2022 |

OTHER PUBLICATIONS

Written Opinion (PCT/ISA/237) issued by the International Searching Authority on Oct. 20, 2023 in corresponding International Application No. PCT/KR2023/009579.

* cited by examiner

ELECTRONIC DEVICE CONNECTED TO WEARABLE DEVICE, AND CONNECTION METHOD THEREFOR

CROSS-REFERENCE TO RELATED APPLICATIONS

This application is a continuation of International Application No. PCT/KR2023/009579, filed on Jul. 6, 2023, which is based on and claims priority to Korean Patent Application No. 10-2022-0106226, filed on Aug. 24, 2022, in the Korean Intellectual Property Office, the disclosures of which are incorporated by reference herein in their entireties.

BACKGROUND

1. Field

The present disclosure relates to an electronic device connected to a wearable device and a connection method therefor.

2. Description of Related Art

Electronic devices of various types are being developed and supplied with the development of electronic technology. Specifically, electronic devices such as a TV which is one of the most widely used home appliance in a typical household have undergone development at a rapid rate for a number of years recently.

As performance of the electronic devices become more advanced, various functions are being provided by connecting an electronic device to another electronic device. For example, a TV may be connected to a wearable device such as wireless earphones or wireless headphones, and sound output from the TV may be provided to a user through the wearable device. At this time, the electronic device may be connected to the wearable device using Bluetooth communication.

SUMMARY

According to an aspect of the present disclosure, an electronic device includes: a first communication interface; a second communication interface; and one or more processors configured to: identify, based on a wearable device being detected to the one or more processors through the first communication interface, a device having a connection history with the wearable device from among at least one of one or more devices; transmit a control command to the identified device through the second communication interface, the control command comprising a command for displaying a user interface (UI) for connection with the wearable device; and control, based on a user input inputted in the UI displayed in the identified device, the first communication interface to connect to the wearable device.

The one or more processors may be further configured to: receive information on a wearable device that was connected to the at least one of the one or more devices through the second communication interface; and identify, based on information on the wearable device received from the wearable device through the first communication interface and information on the wearable device received from the at least one of the one or more devices through the second communication interface, the device having the connection history with the wearable device from among the one or more devices.

The one or more processors may be further configured to transmit a control command for displaying a UI for performing a connection process between the electronic device and the wearable device to the identified device in a state in which the connection history does not exist between the electronic device and the wearable device.

The one or more processors may be further configured to control, based on the user input inputted in the identified device through the UI being received from the identified device through the second communication interface, the first communication interface to connect to the wearable device according to the received user input.

The one or more processors may be further configured to transmit a control command for displaying a UI for receiving confirmation on whether to connect the wearable device to the electronic device to the identified device in a state in which the connection history exists between the electronic device and the wearable device.

The one or more processors may be further configured to control, based on the user input inputted in the identified device through the UI being received from the identified device through the second communication interface, the first communication interface to connect to the wearable device according to the received user input.

The one or more processors may be further configured to control the first communication interface to connect to the wearable device via Bluetooth™.

According to another aspect of the present disclosure, a connection method of an electronic device includes: identifying, based on a wearable device being detected, a device that has a connection history with the wearable device from among at least one of one or more mobile devices; transmitting a control command for displaying a user interface (UI) for connection with the wearable device to the identified device; and connecting, based on a user input inputted in the UI displayed in the identified device, the electronic device to the wearable device.

The identifying may include: receiving information on a wearable device that has been connected to the one or more devices from the one or more devices; and identifying, based on information on the wearable device received from the wearable device and information on the wearable device received from the at least one of the one or more devices, the device that has the connection history with the wearable device from among the one or more devices.

The transmitting may include transmitting a control command for displaying a UI for performing a connection process between the electronic device and the wearable device to the identified device in a state in which the connection history does not exist between the electronic device and the wearable device.

The connecting may include connecting, based on the user input inputted in the identified device through the UI being received from the identified device, the electronic device to the wearable device according to the received user input.

The transmitting may include transmitting a control command for displaying a UI for receiving confirmation on whether to connect the wearable device to the electronic device to the identified device in a state in which the connection history exists between the electronic device and the wearable device.

The connecting may include connecting, based on the user input inputted in the identified mobile device through the UI being received from the identified device, with the electronic device to the wearable device according to the received user input.

The connecting may include connecting the electronic device to the wearable device via Bluetooth™.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
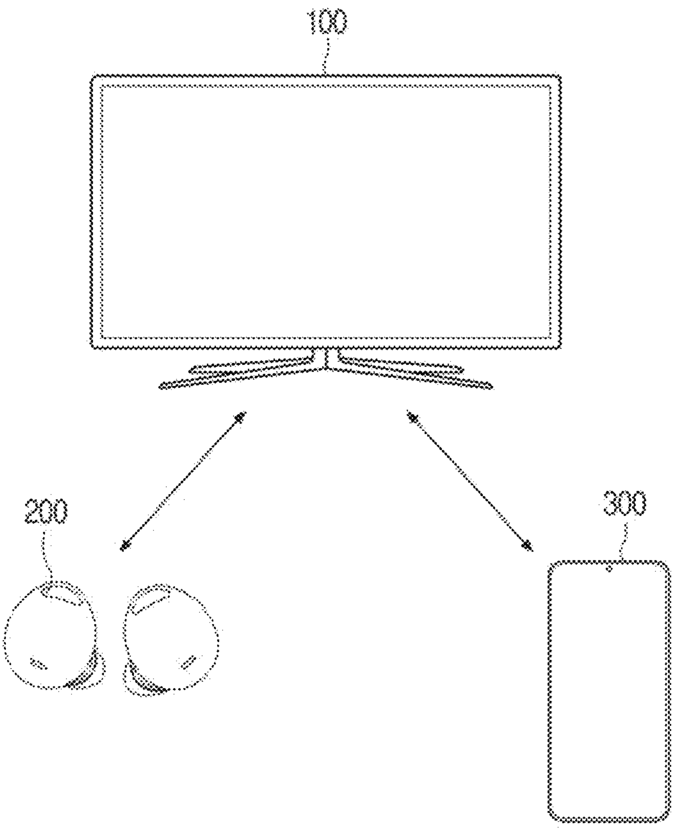
FIG. 1 is a diagram illustrating an electronic device according to some embodiments of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but that they should be interpreted to include all modifications, equivalents or alternatives of the embodiments included in the ideas and the technical scopes disclosed herein. With respect to the description of the drawings, like reference numerals may be used to indicate like elements.

In describing the disclosure, in case it is determined that the detailed description of related known technologies or configurations may unnecessarily confuse the gist of the disclosure, the detailed description thereof will be omitted.

Further, the embodiments below may be modified to various different forms, and it is to be understood that the scope of the technical spirit of the disclosure is not limited to the embodiments below. Rather, the embodiments are provided so that the disclosure will be thorough and complete, and to fully convey the technical spirit of the disclosure to those skilled in the art.

Terms used in the disclosure have been merely used to describe a specific embodiment, and is not intended to limit the scope of protection. A singular expression includes a plural expression, unless otherwise specified.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

In the disclosure, expressions such as "A or B", "at least one of A and/or B", or "one or more of A and/or B" may include all possible combinations of the items listed together. For example, "A or B", "at least one of A and B", or "at least one of A or B" may refer to all cases including (1) at least one A, (2) at least one B, or (3) both of at least one A and at least one B.

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

Conversely, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ", "having the capacity to . . . ", "designed to . . . ", "adapted to . . . ", "made to . . . ", or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, a phrase "a processor configured to (or set up to) perform A, B, or C" may mean a dedicated processor for performing a relevant operation (e.g., an embedded processor), or a generic-purpose processor (e.g., a central processing unit (CPU) or an application processor) capable of performing the relevant operations by executing one or more software programs stored in a memory device.

The term 'module' or 'part' used in the embodiments herein perform at least one function or operation, and may be implemented with a hardware or software, or implemented with a combination of hardware and software. In addition, a plurality of 'modules' or a plurality of 'parts', except for a 'module' or a 'part' which needs to be implemented with a specific hardware, may be integrated in at least one module and implemented as at least one processor.

Meanwhile, the various elements and areas of the drawings have been schematically illustrated. Accordingly, the technical spirit of the disclosure is not limited by relative sizes and distances illustrated in the accompanied drawings.

Embodiments of the disclosure will be described in detail below with reference to the accompanying drawings to aid in the understanding of those of ordinary skill in the art.

FIG. 1 is a diagram illustrating an electronic device according to some embodiments of the disclosure.

Referring to FIG. 1, an electronic device 100 may be connected with a wearable device 200. Here, as shown in FIG. 1, the electronic device 100 may be a television (TV), and the wearable device 200 may be wireless earphones.

However, the above is one example, and the electronic device and the wearable device may be devices of various types. For example, the electronic device 100 may include at least one from among an audio, a refrigerator, an air conditioner, a cleaner, an oven, a microwave oven, a washer, an air purifier, a set top box, a medical device, a camera, or a digital video disk (DVD) player.

In addition, the wearable device may include at least one from among an accessory type (e.g., wireless headphones, a watch, a ring, a bracelet, an anklet, a necklace, a pair of glasses, contact lenses, or a head-mounted-device (HMD)), a fabric or a garment-embedded type (e.g., an electronic clothing), a body-attached type (e.g., a skin pad or a tattoo), or a bio-implantable circuit.

Meanwhile, the electronic device 100 may provide, before connecting to the wearable device 200, a user interface (UI) for inquiring whether or not to connect to the wearable device to the electronic device 100. Accordingly, the electronic device 100 may perform, based on a user input for approving the connection with the wearable device 200 being input through the UI, connection with the wearable device 200.

That is, if the electronic device 100 has the properties of a common device which a plurality of users can use such as a TV, the electronic device 100 may provide the UI even if there is a connection history (or a paired history) with the wearable device 200, and confirm with a user as to whether the wearable device 200 is the correct device that the user wishes to connect to the electronic device 100.

At this time, according to some embodiments of the disclosure, the electronic device 100 may display the UI in a device 300. Further, the electronic device 100 may perform, based on a user input being inputted through the UI displayed in the device 300, the connection with the wearable device 200.

As described above, according to some embodiments of the disclosure, based on being able to connect the wearable device 200 to the electronic device 100 according to the user input inputted through the device 300 that is usually carried by the user or present in the surrounding of the user even if there is no separate remote controller for controlling the electronic device 100, user convenience may be improved.

Meanwhile, in FIG. 1, the device 300 is shown as a mobile device. However, the above is merely one example, and the device 300 may be devices of various types that can receive input of the user input. Here, the user input may be inputted through the UI displayed in the device 300, or inputted through a user voice. For example, the device 300 may include at least one from among a wearable device, an audio, a refrigerator, an air conditioner, a cleaner, an oven, a microwave oven, a washer, an air purifier, a set top box, a medical device, a camera, or a DVD player.

Figure 2:
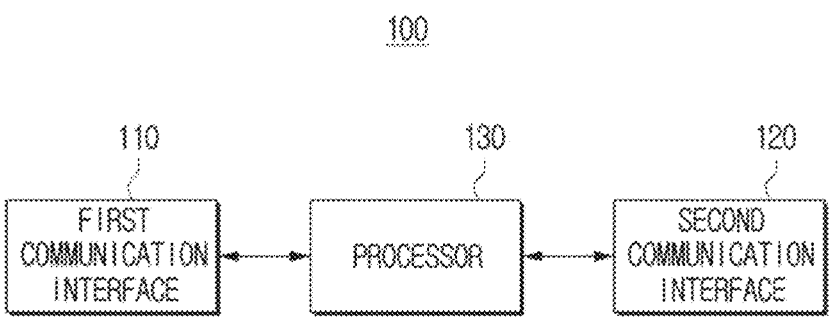
FIG. 2 is a block diagram illustrating a configuration of an electronic device according to some embodiments of the disclosure.

FIG. 2 is a block diagram illustrating a configuration of an electronic device according to some embodiments of the disclosure.

Referring to FIG. 2, the electronic device 100 may include a first communication interface 110, a second communication interface 120, and a processor 130.

The first communication interface 110 may include circuitry. The first communication interface 110 may communicate with an external electronic device. To this end, the first communication interface 110 may include a Bluetooth module for performing communication using a Bluetooth method.

The second communication interface 120 may include circuitry. The first communication interface 110 may communicate with the external electronic device. To this end, the second communication interface 110 may include a Wi-Fi module for performing communication using a Wi-Fi method.

The processor 130 may be electrically connected with the first communication interface 110 and the second communication interface 120, and control an overall operation and functions of the electronic device 100. The processor 130 may control the overall operation of the electronic device 100 using various instructions or programs stored in a memory. Specifically, according to some embodiments, a main CPU may copy a program in a random access memory (RAM) according to instructions stored in a read only memory (ROM), and execute a relevant program by accessing the RAM.

The processor 130 may be connected with the wearable device 200 through the first communication interface 110. That is, the processor 130 may communicate by being connected with the wearable device 200 using the Bluetooth method through the first communication interface 110.

To this end, the processor 130 may identify, based on a wearable device 200 being detected through the first communication interface 110, a mobile device 300 that has a connection history with the wearable device 200 from among the at least one of the one or more mobile devices.

For example, it may be assumed that the wearable device 200 are wireless earphones. At this time, if the user takes out the wireless earphones from a case (or cradle), or opens a cover of a case in which the wireless earphones are contained, the wearable device 200 may broadcast a signal for notifying its presence. In this case, the processor 130 may scan the surrounding of the electronic device 100 through the first communication interface 110, and discover the wearable device 200 capable of Bluetooth communication in the surrounding of the electronic device 100. Further, the processor 130 may obtain, in the process of scanning for the wearable device, information on the wearable device 200 (e.g., a name, an address, and the like of the device) from the wearable device 200.

In addition, the processor 130 may receive information on the wearable device which was connected with at least one of the devices from at least one of the one or more mobile devices through the second communication interface 120.

That is, it may be assumed that a device has performed connection with a wearable device using the Bluetooth method. In this case, the device may receive information on the wearable device from the wearable device, and register the received information. That is, the device may perform pairing with the wearable device. In this case, for example, the device may have information on the wearable device (e.g., the name of the device, Bluetooth version, device type information, supported feature, link key information, low energy (LE) key, address, etc.) stored in a Bluetooth paired list.

Accordingly, the processor 130 may request transmission of information on a wearable device which was connected (or, paired) with at least one of the devices to at least one of the devices through the second communication interface 120. Further, the processor 130 may receive relevant information from at least one of the devices through the second communication interface 120.

To this end, the processor 130 may be connected with at least one of the devices through the second communication interface 120. That is, the processor 130 may communicate by being connected with at least one of the devices using the Wi-Fi method through the second communication interface 120.

Specifically, the processor 130 may control the second communication interface 120 to communicate with at least one of the devices through a Wi-Fi network.

In this case, the processor 130 may communicate with at least one of the devices in a Wi-Fi direct method, or communicate with at least one of the devices through an access point (AP). In addition, the processor 130 may be connected to a server through the AP, and communicate with at least one of the devices through the server. Here, the server may be a device for controlling and managing various devices (e.g., home appliances and Internet of Things (IoT) devices, etc.) registered in the server. At this time, the server may register devices for each user account. Further, if the electronic device 100 and at least one of the devices are registered to a same user account, the server may relay communication between the electronic device 100 and at least one of the devices. In this case, at least one or the devices may display a notification (e.g., a UI for connection between the electronic device 100 and the wearable device 200) received from the server through an application.

Further, the processor 130 may identify, based on information on the wearable device 200 received from the wearable device 200 through the first communication interface 110 and information on a wearable device received from at least one of the devices through the second communication interface 120, the device 300 that has the connection history with the wearable device 200 from among at least one of the mobile devices.

That is, the processor 130 may identify, based on information on the wearable device 200 obtained in a scanning process and information of a wearable device that has the connection history with at least one of the devices received from at least one of the mobile devices, the device 300 that has the connection history with the wearable device 200.

For example, the processor 130 may compare information on a name of the wearable device 200 received from the wearable device 200 with information on a name of a wearable device received from at least one of the devices, and identify a device that transmitted a name of a device that is same as the name of the wearable device 200 from among the at least one of the devices as the device 300 that has the connection history with the wearable device 200.

As described above, the identifying the device 300 may be for identifying the device 300 of the user that has a high likelihood of having connected the wearable device 200 which the user wishes to connect to the electronic device 100 to a device 300 that he or she usually carries or is present in the surrounding of the user.

Then, the processor 130 may transmit a control command for displaying a UI for connecting with the wearable device 200 to the device 300 through the second communication interface 120. Then, the processor 130 may control, based on a user input inputted through the UI displayed in the identified device 300, the first communication interface 110 to perform connection with the wearable device 200. Here, the processor 130 may control the first communication interface 110 to perform connection with the wearable device 200 using the Bluetooth method.

At this time, the processor 130 may display different UIs in the device 300 according to whether there is the history of the electronic device 100 being connected with the wearable device 200 through the first communication interface 110.

To this end, the processor 130 may identify, based on information on the wearable device that was connected with the electronic device 100, whether there is the connection history between the electronic device 100 and the wearable device 200.

That is, the processor 130 may register information on the wearable device received from the wearable device in a pairing process if connection with the wearable device was performed using the Bluetooth method through the first communication interface 110. For example, the processor 130 may have the information on the wearable device (e.g., the name of the device, the Bluetooth version, the device type information, the supported feature, the link key information, the LE key, the address, etc.) stored in the Bluetooth paired list.

Accordingly, the processor 130 may identify, based on information on the wearable device 200 obtained in the scanning process and pre-stored information on the wearable device, whether there is the connection history with the wearable device 200.

For example, the processor 130 may identify, based on a same name as the name of the wearable device 200 received from the wearable device 200 being pre-stored in the electronic device 100, as there being the connection history with the wearable device 200.

Accordingly, the processor 130 may identify whether there is history of the wearable device 200 having been connected to the electronic device 100.

At this time, the processor 130 may transmit, based on there being no the connection history between the electronic device 100 and the wearable device 200, the control command for displaying a UI for performing a connection process between the electronic device 100 and the wearable device 200 to the device 300 through the second communication interface 120.

That is, the processor 130 may display a UI for receiving input of a user input for performing pairing and connection between the electronic device 100 and the wearable device 200 in the device 300 based on pairing between the electronic device 100 and the wearable device 200 not having been performed.

In this case, the device 300 may display the UI based on the control command received from the electronic device 100, and transmit the user input inputted through the UI to the electronic device 100. Here, the device 300 may display the UI using an application installed in the device 300. At this time, the information for the device 300 to display the UI (e.g., the name of the wearable device 200, etc.) may be provided from the electronic device 100. That is, the processor 130 may transmit the information used in displaying the UI to the device 300 using the second communication interface 120, or transmit to the device 300 through the server.

Accordingly, the processor 130 may control, based on the user input inputted in the device 300 through the UI being received from the identified device 300 through the second communication interface 120, the first communication interface 110 to perform connection with the wearable device 200 according to the received user input.

In FIG. 3A, FIG. 4A, FIG. 5A, and FIG. 6A below, it may be assumed that the device 300 is a smartphone 300-1, and in FIG. 3B, FIG. 4B, FIG. 5B, and FIG. 6B, it may be assumed that the device 300 is a smart watch 300-2.

Figure 3A:
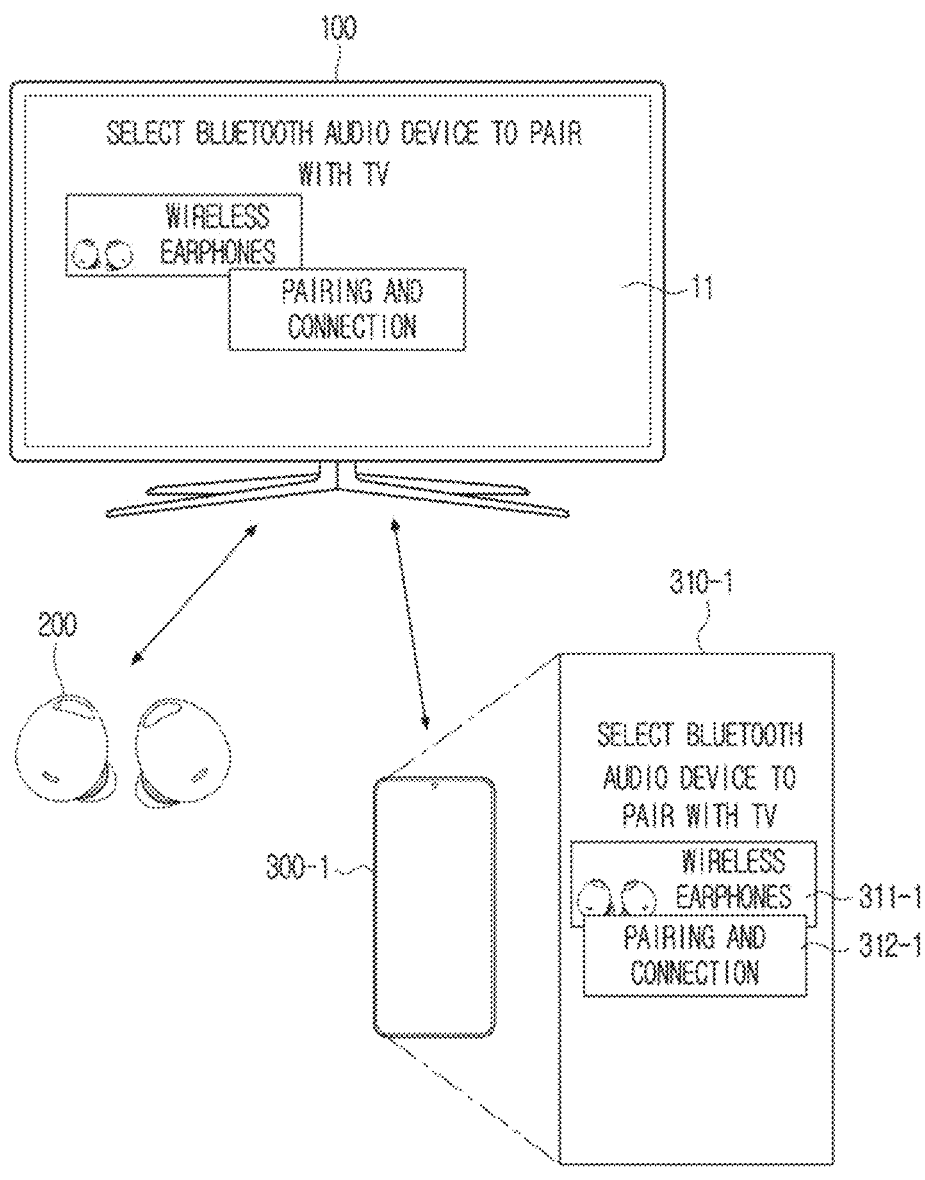
FIGS. 3A through. 7 are diagrams illustrating a method for connecting a wearable device using a device according to some embodiments of the disclosure.
Figure 3B:
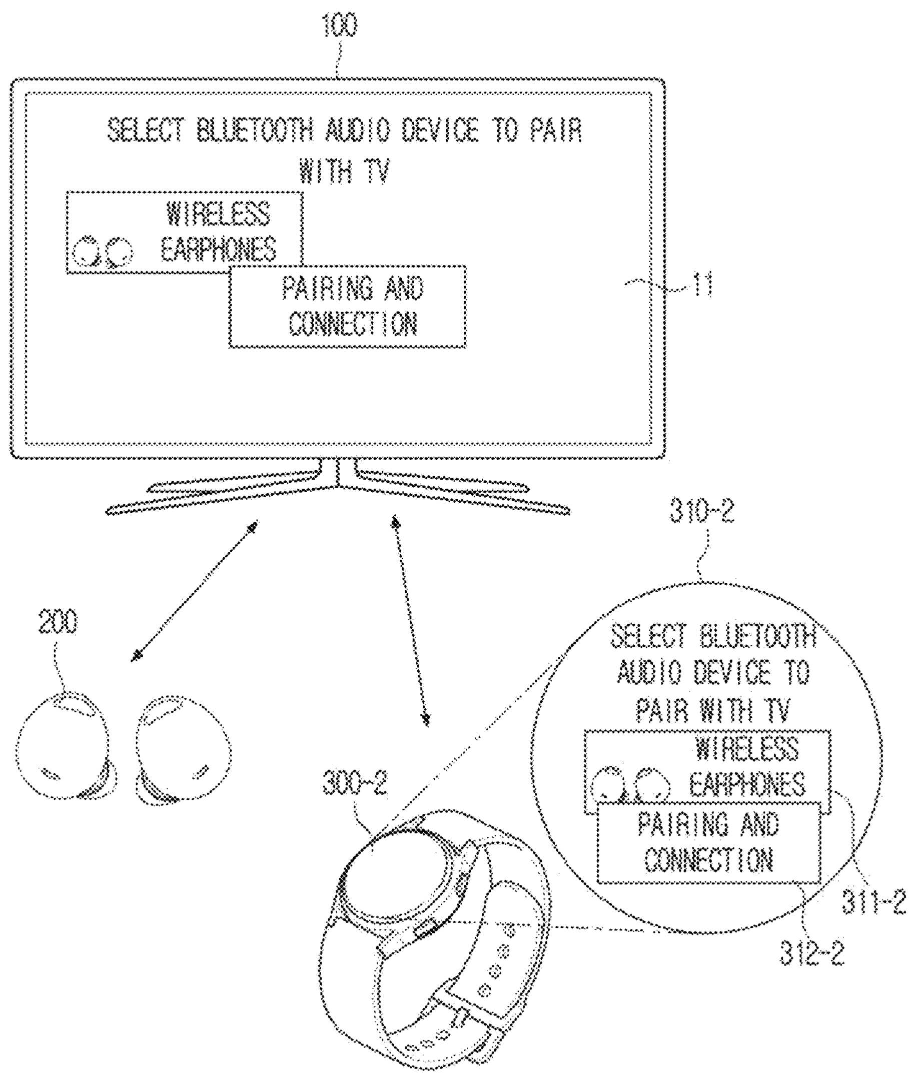

For example, as in FIG. 3A and FIG. 3B, the processor 130 may display UIs 310-1 and 310-2 including GUIs 311-1 and 311-2 for receiving input of a user input for selecting a device in which paring and connection with the electronic device 100 is to be performed and GUIs 312-1 and 312-2 for receiving input of a user input for performing pairing and connection with the selected wearable device 200 in the devices 300-1 and 300-2. In this case, the processor 130 may display a UI 11 having the same configuration as the UIs 310-1 and 310-2 displayed in the devices 300-1 and 300-2 in also a display of the electronic device 100.

Accordingly, the user may select the GUIs 311-1 and 311-2 and the GUIs 312-1 and 312-2 through the device 300. For example, the user may touch the GUIs 312-1 and 312-2 after touching the GUIs 311-1 and 311-2 displayed on touch screens of the devices 300-1 and 300-2. In this case, the device 300 may transmit the inputted user input to the electronic device 100.

Accordingly, the processor 130 may control, based on the user input being received from the devices 300-1 and 300-2, the first communication interface 110 to perform pairing and connection with the wearable device 200 using the Bluetooth method.

Figure 4A:
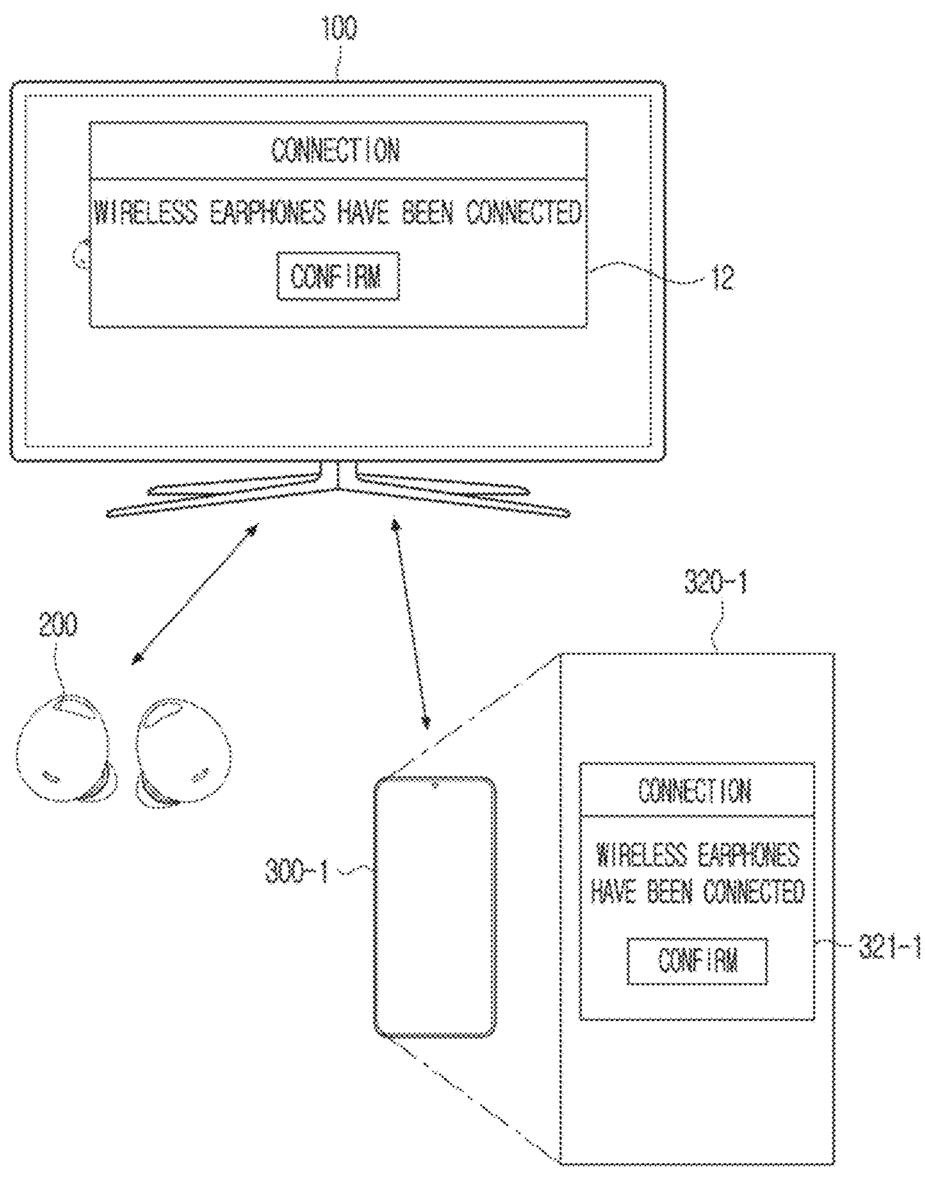
Figure 4B:
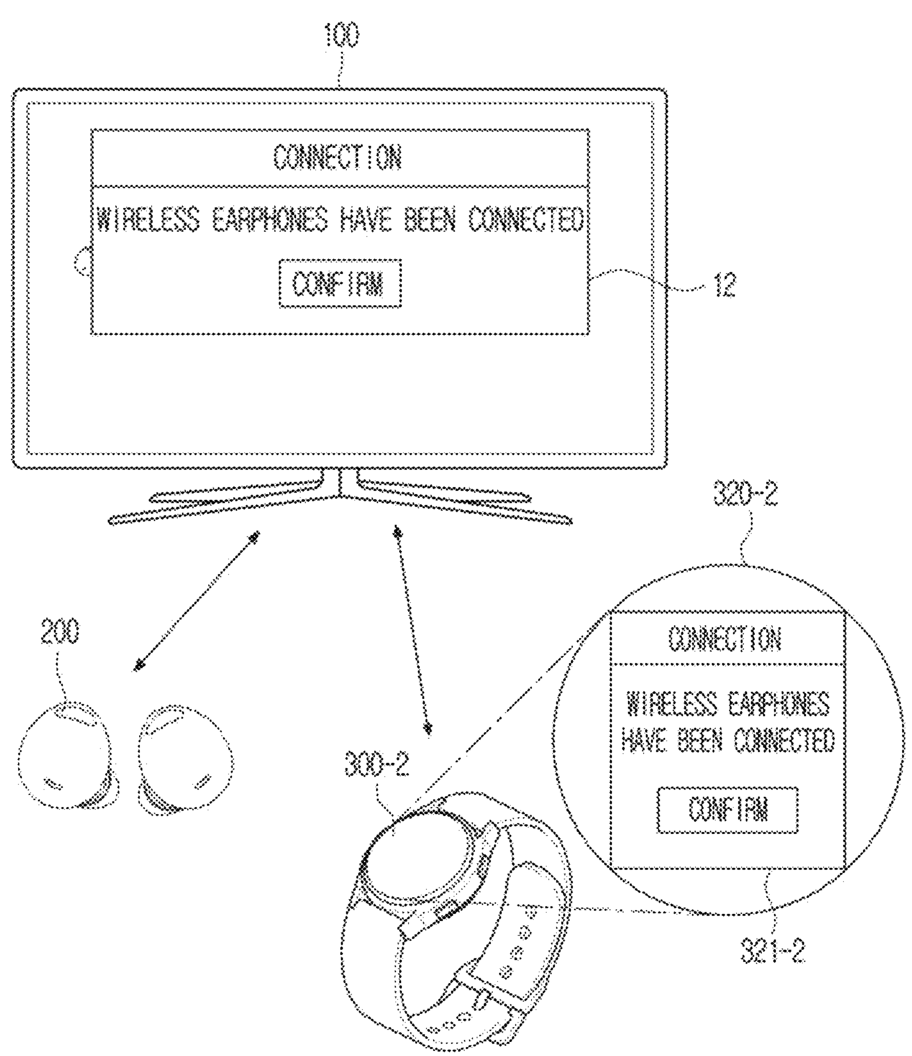

Further, as shown in FIG. 4A and FIG. 4B, the processor 130 may display, based on connection with the wearable device 200 being completed, UIs 320-1 and 320-2 including GUIs 321-1 and 321-2 indicating that the connection with the wearable device 200 has been completed in the devices 300-1 and 300-2. In this case, the processor 130 may display a UI 12 having the same configuration as the UIs 320-1 and 320-2 displayed in the devices 300-1 and 300-2 in the display of the electronic device 100.

Meanwhile, the processor 130 may transmit, based on there being the connection history between the electronic device 100 and the wearable device 200, a control command for displaying a UI for confirming whether to connect the wearable device 200 to the identified device 300.

That is, the processor 130 may not perform, based on pairing between the electronic device 100 and the wearable device 200 having already been performed, the pairing process again, and display a UI for receiving confirmation on whether the wearable device 200 is the correct device with which the user wishes to connect in the display 300.

In this case, the device 300 may display the UI based on the control command received from the electronic device 100, and transmit the user input inputted through the UI to the electronic device 100. Here, the device 300 may display the UI using the application installed in the device 300. At this time, the information for the display 300 to display the UI (e.g., the name of the wearable device 200, etc.) may be provided from the electronic device 100. That is, the processor 130 may transmit the information used in displaying the UI to the device 300 using the second communication interface 120, or transmit to the device 300 through the server.

Accordingly, the processor 130 may control, based on the user input inputted in the mobile device 300 through the UI being received from the device 300 identified through the second communication interface 120, the first communication interface 110 to perform connection with the wearable device 200 according to the received user input.

Figure 5A:
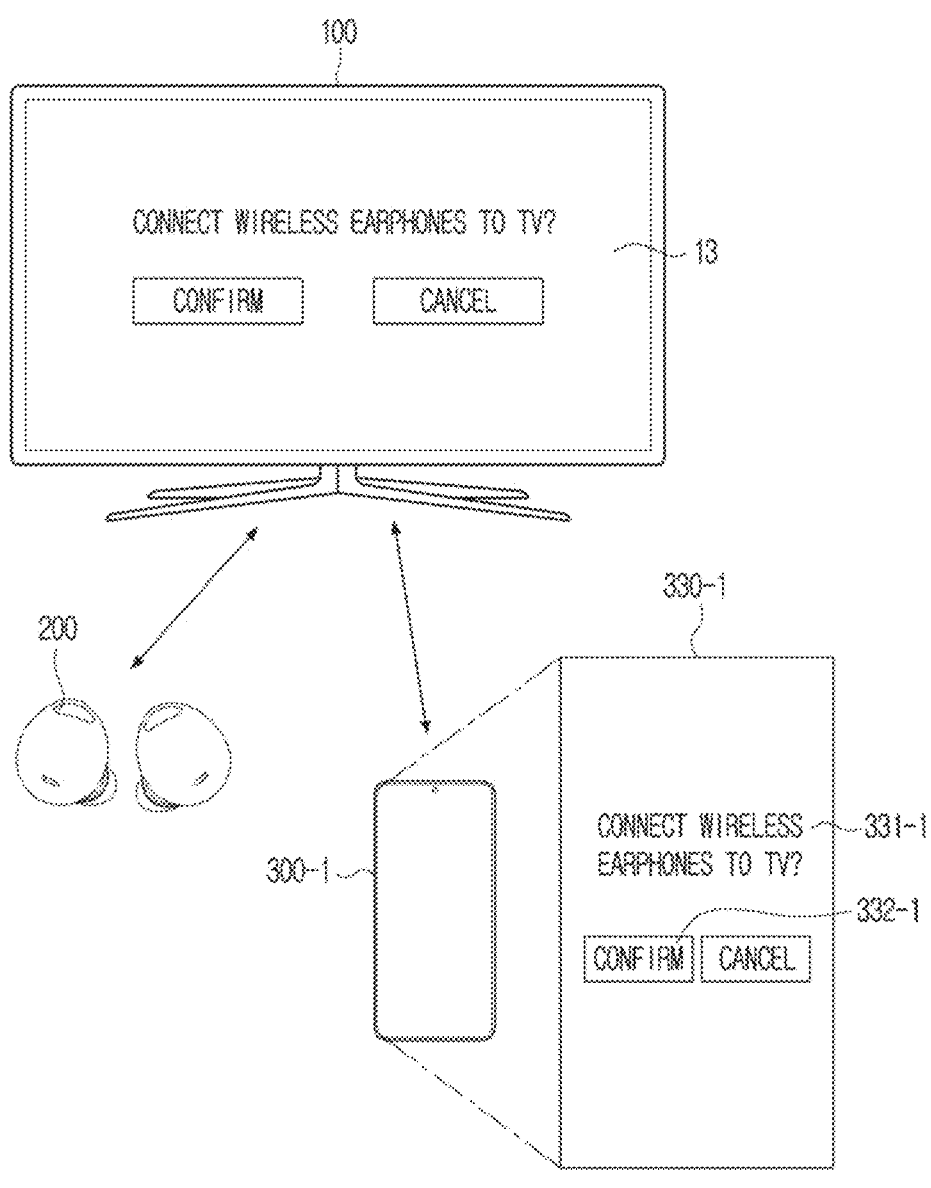
Figure 5B:
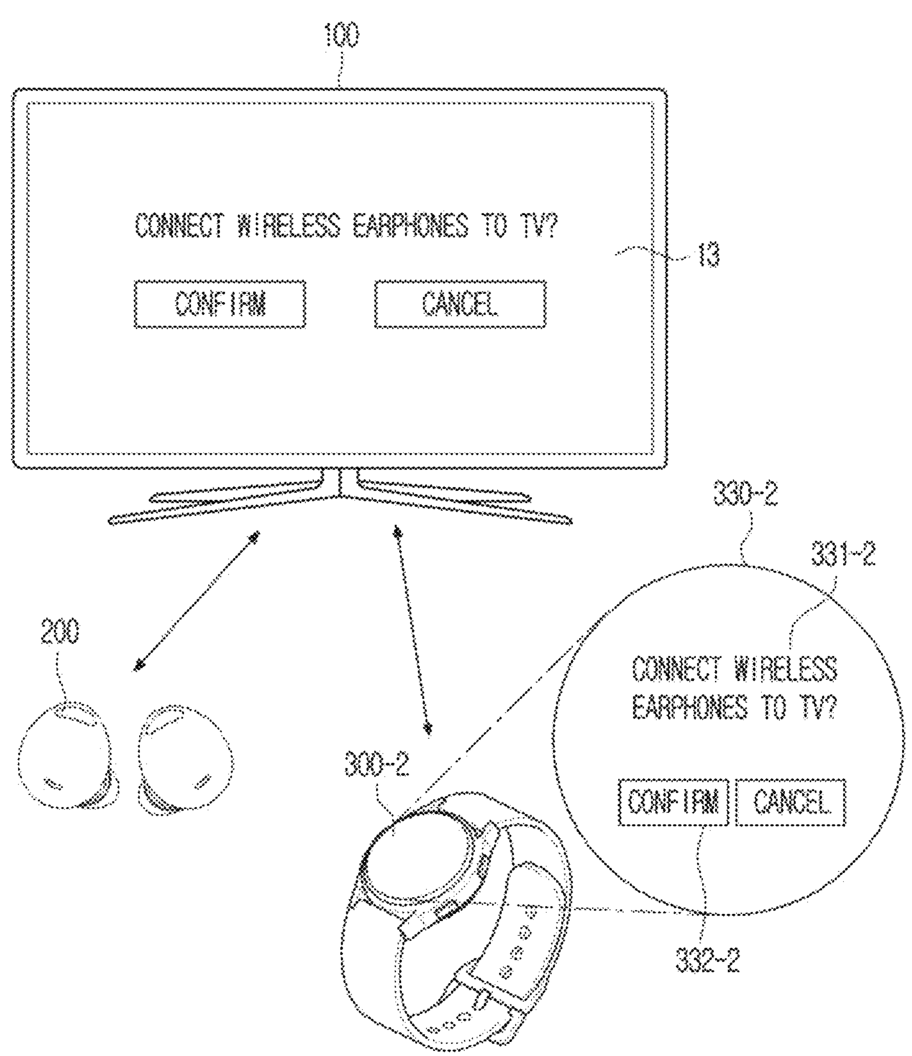

For example, as in FIG. 5A and FIG. 5B, the processor 130 may display UIs 330-1 and 330-2 including texts 331-1 and 331-2 such as "connect wireless earphones to TV?" and GUIs 332-1 and 332-2 for receiving input of a user input for approving connection with the wearable device 200 in the devices 300-1 and 300-2. In this case, the processor 130 may display a UI 13 having the same configuration as the UIs 330-1 and 330-2 displayed in the devices 300-1 and 300-2 in the display of the electronic device 100.

Accordingly, the user may select GUIs 332-1 and 332-2 through the devices 300-1 and 300-2. For example, the user may touch the GUIs 332-1 and 332-2 displayed on the touch screens of the devices 300-1 and 300-2. In this case, the device 300 may transmit the inputted user input to the electronic device 100.

Accordingly, the processor 130 may control, based on the user input being received from the device 300, the first communication interface 110 to perform connection with the wearable device 200 using the Bluetooth method.

Figure 6A:
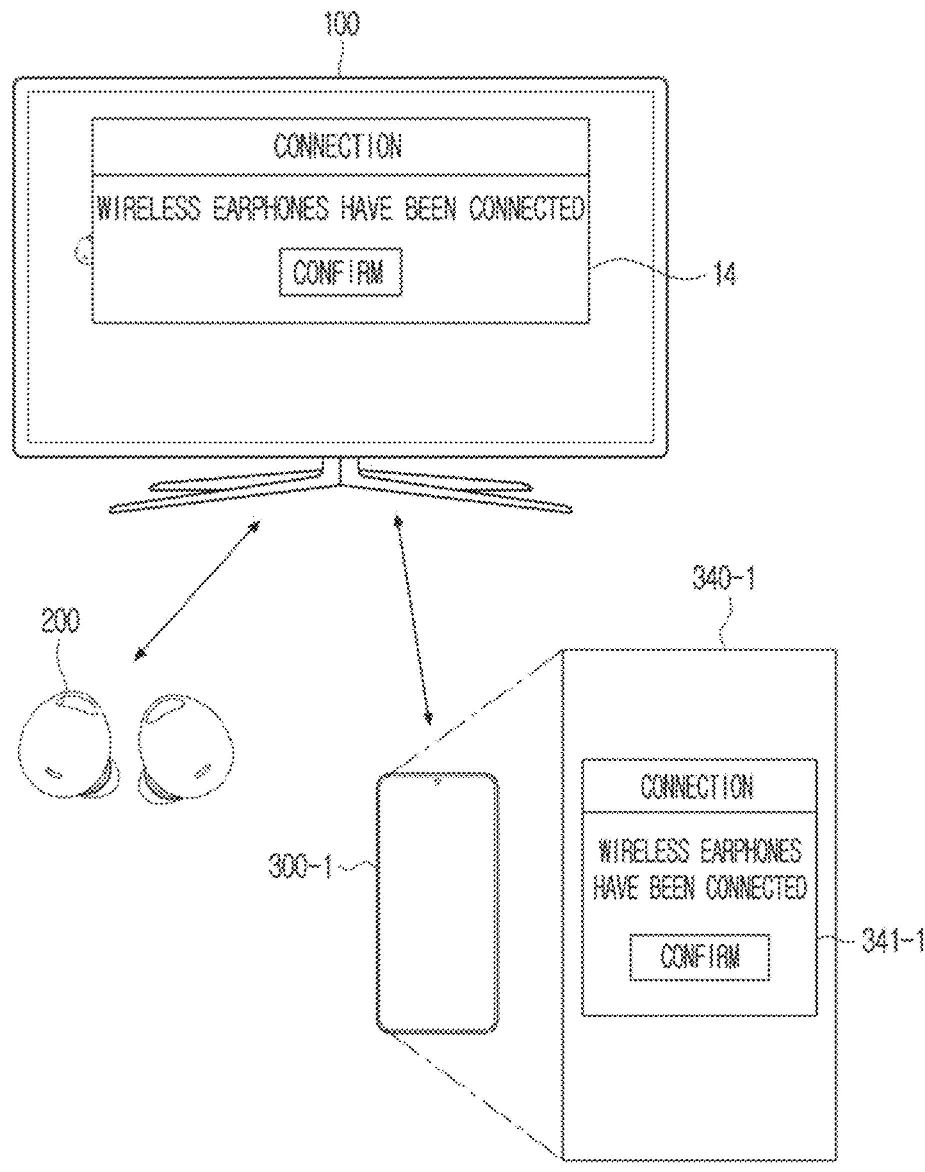
Figure 6B:
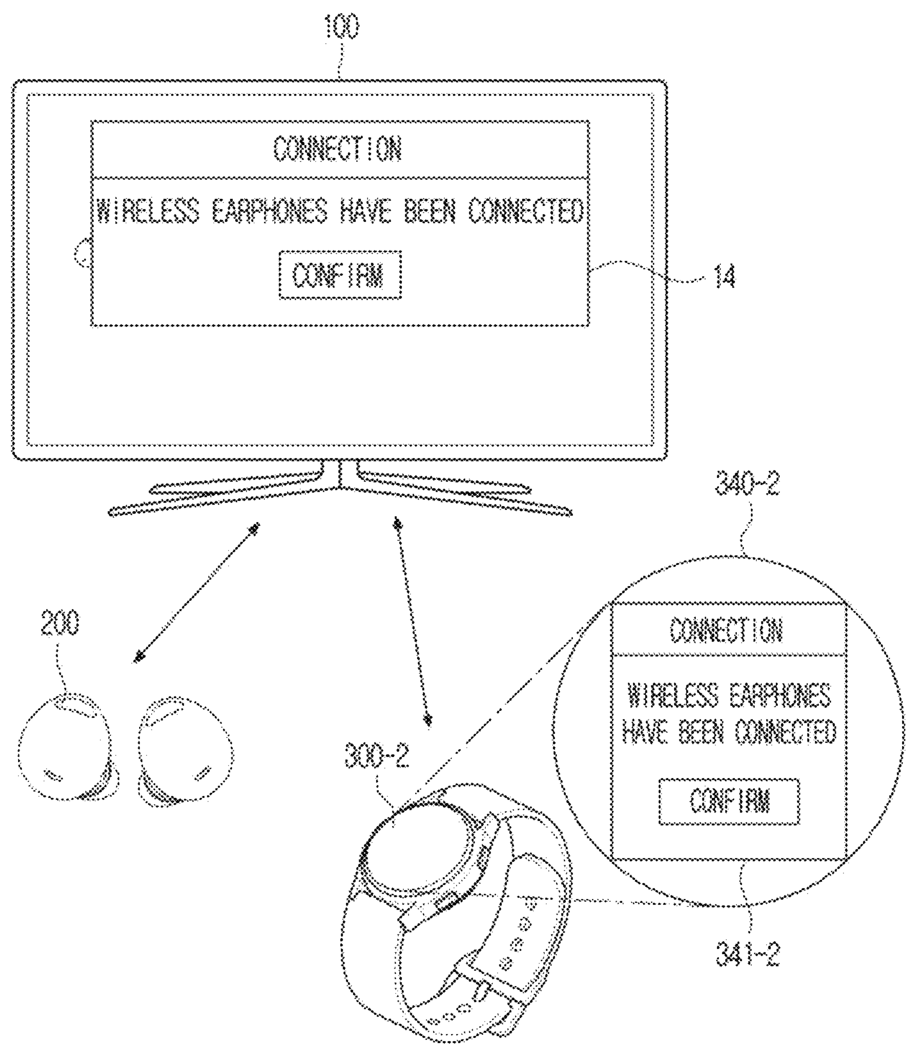

Further, as in FIG. 6A and FIG. 6B, the processor 130 may display, based on connection with the wearable device 200 being completed, UIs 340-1 and 340-2 including GUIs 341-1 and 341-2 indicating that the connection with the wearable device 200 has been completed in the devices 300-1 and 300-2. In this case, the processor 130 may display a UI 14 having the same configuration as the UIs 340-1 and 340-2 displayed in the devices 300-1 and 300-2 in also the display of the electronic device 100.

As described above, referring to FIG. 3A to FIG. 6B, the processor 130 may not only display a device connection screen for connection with the wearable device 200 in the display of the electronic device 100, but also display in the devices 300-1 and 300-2. Then, the processor 130 may perform the connection with the wearable device 200 based on the user input inputted through the UI displayed in the devices 300-1 and 300-2.

According to various embodiments of the disclosure, the UI for connecting the wearable device 200 to the electronic device 100 may be displayed in the device 300 that the user carries or that is present in the surrounding of the user, and may connect the wearable device 200 to the electronic device 100 according to the user input inputted through the UI. Accordingly, even if there is no separate remote controller for controlling the electronic device 100, user convenience may be improved due to being able to connect the wearable device 200 to the electronic device 100.

Meanwhile, in the above-described example, although the user has been described as touching the GUI displayed on the touch screen of the device 300, this is merely one example. That is, the user may control the connection between the electronic device 100 and the wearable device 200 using user inputs in various forms in addition to touching.

In an example, the user may control the connection between the electronic device 100 and the wearable device 200 through voice. Specifically, in the case of FIG. 3A and FIG. 3B, the user may utter "connect with wireless earphones", and in the case of FIG. 5A and FIG. 5B, the user may utter "connect". In this case, the device 300 may receive the user voice, and perform voice recognition for the received user voice. Then, the device 300 may identify, as a result of the voice recognition, that the user voice has the intent of connecting the TV with the wireless earphones, and transmit a command according to the identified intent to the electronic device 100. In this case, the processor 130 may control, based on the user input being received from the device 300, the first communication interface 110 to perform connection with the wearable device 200 using the Bluetooth method.

Meanwhile, the UI displayed in the electronic device 100 may be provided through an application installed in the electronic device 100. In an example, the application may be a wearable device setting application for controlling and managing the connection between the electronic device 100 and the wearable device and the setting and the like of the wearable device connected to the electronic device 100.

In addition, the UI displayed in the device 300 may be provided through the application installed in the device 300. In an example, the application may be a smart hub application for connecting to the server. Here, the server may be a device for controlling and managing the devices registered for each of the user accounts.

Specifically, the processor 130 may transmit a control command for requesting information on a wearable device that was connected with at least one device to the server. In this case, the server may request transmission of information on the wearable device that was connected with at least one device to the at least one device registered in the same account as the electronic device. Accordingly, the at least one device may transmit, based on the request received from the server, information on the wearable device that was connected with itself to the server.

In this case, the server may transmit information on the wearable device received from the at least one device to the electronic device 100. Accordingly, the processor 130 may identify, based on information on the wearable device being received from the server, the device 300 that has the connection history with the wearable device 200 based on the received information.

Then, the processor 130 may transmit the control command for displaying the UI for connection with the wearable device 200 to the server. Accordingly, the server may transmit the control command for displaying the UI to the device 300, and the device 300 may display a UI through the smart hub application based on the control command received from the server.

Meanwhile, the electronic device 100 may set, based on the wearable device 200 being connected, a state of the wearable device 200 based on information on a setting state of the wearable device 200 provided from the device 300.

Here, if the wearable device 200 is wireless earphones or wireless headphones, the setting state of the wearable device 200 may include setting values for volume, equalizer, and the like.

Specifically, the device 300 may store information on the setting state of the wearable device 200 that was connected with the device 300. In this case, the device 300 may store, for each wearable device 200, information on the volume, equalizer, and the like of the wearable device 200 set by the user after the wearable device 200 is connected to the device 300 and before the connection is released.

Further, the device 300 may transmit information on the setting state of the wearable device 200 to the electronic device 100.

Accordingly, the processor 130 may set, based on information on the setting state of the wearable device 200 received from the device 300 through the second communication interface 120, a state of the wearable device 200 connected to the electronic device 100.

For example, if the wearable device 200 which is wireless earphones is connected to the device 300, it may be assumed that the volume is set to 20 from among the volume range of 0 to 100.

In this case, the processor 130 may set, based on information on the volume received from the device 300, the volume of the wearable device 200 to 20 when the wearable device 200 is connected to the electronic device 100. Accordingly, the wearable device 200 may output, based on an audio signal being received from the electronic device 100, an audio level corresponding to the set volume.

As described above, according to some embodiments of the disclosure, when the user uses the wearable device 200 through the device 300, the setting state of the wearable device 200 may also be used when the wearable device 200 is connected to the electronic device 100. That is, the electronic device 100 may be set to different volumes according to what content of which type is being provided. For example, the electronic device 100 may output, based on a TV program being provided, audio in a volume set in the set top box, and output, based on content being provided through a video streaming service, audio in a volume set through an application that provides the video streaming service.

As described above, based on the electronic device 100 being able to output audio in different volumes according to what content is being provided, there is inconvenience for the user having to adjust the volume if the volume is relatively subdued or loud. In addition, the volume described above may not be suitable for when providing the audio through the wearable device 200 in light of it being the volume when outputting audio through a speaker of the electronic device 100 rather than the wearable device 200.

Accordingly, according to some embodiments of the disclosure, the user may use the setting of the wearable device 200 that was used when the wearable device 200 was connected to the device 300 even when the wearable device 200 is connected to the electronic device 100.

Meanwhile, the electronic device 100 may display a UI indicating that the state of the wearable device 200 connected to the electronic device 100 is to be set according to information on the setting state of the wearable device 200 received from the device 300.

Figure 7:
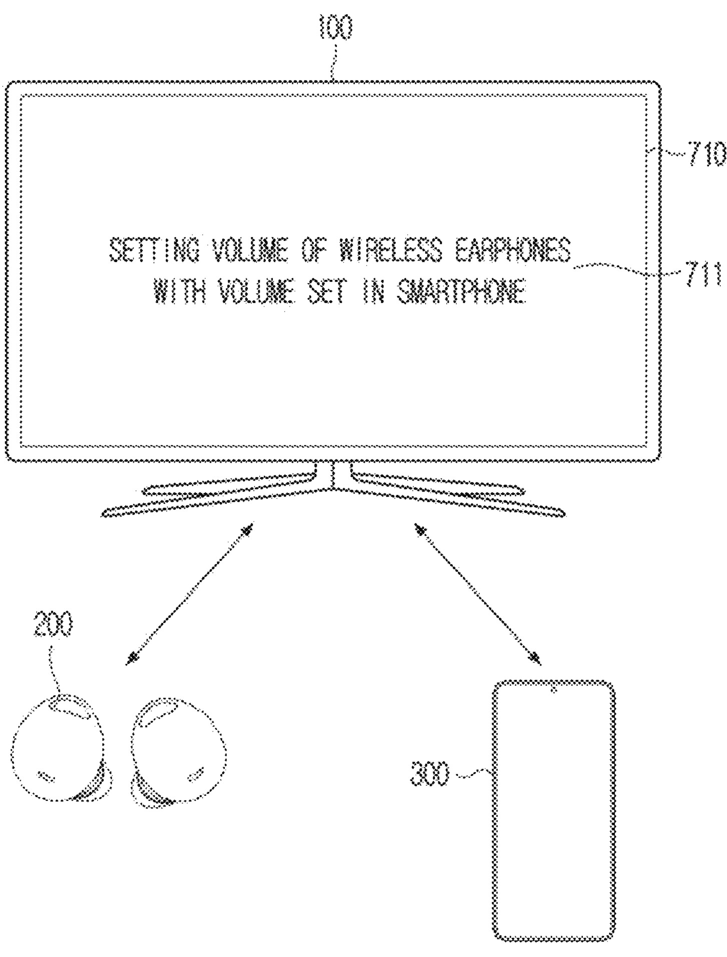

For example, as in FIG. 7, the processor 130 may display a UI 710 including a text 711 such as "setting volume of wireless earphones with volume set in smartphone" in the display of the electronic device 100.

Figure 8:
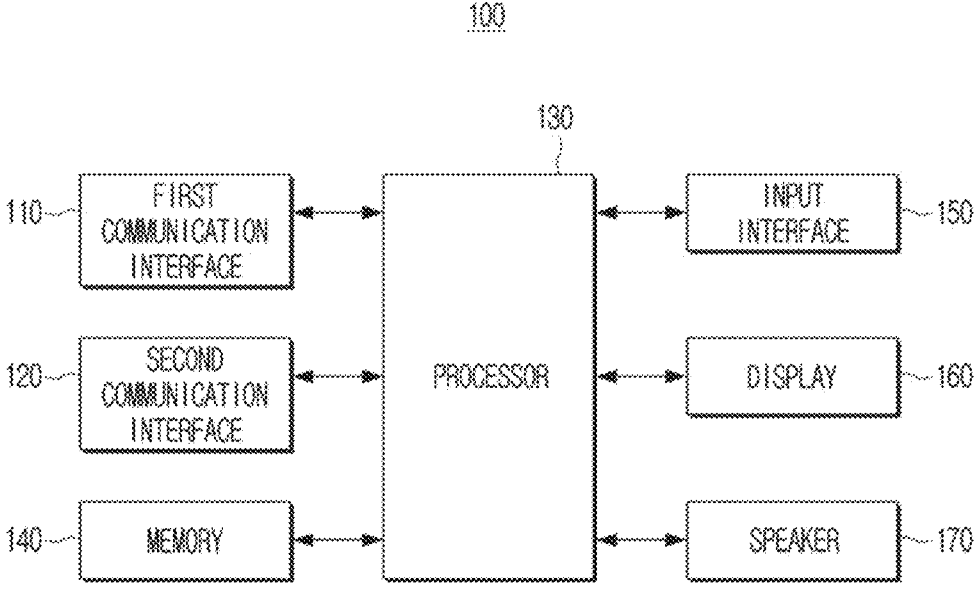
FIG. 8 is a block diagram illustrating a detailed configuration of an electronic device according to some embodiments of the disclosure.

FIG. 8 is a block diagram illustrating a detailed configuration of an electronic device according to some embodiments of the disclosure.

Referring to FIG. 8, the electronic device 100 may further include a memory 140, an input interface 150, a display 160, and a speaker 170 in addition to the first communication interface 110, the second communication interface 120, and the processor 130. However, the configurations as described above are merely examples, and new configurations may be added or a portion of the configurations may be omitted in addition to the above-described configurations in implementing the disclosure. Meanwhile, in describing FIG. 7, descriptions that overlap with FIG. 1 to FIG. 7 may be omitted.

The memory 140 may be stored with at least instruction and at least one software program for driving the electronic device 100. In this case, the memory 140 may include a semiconductor memory, and the like such as a flash-memory. Meanwhile, in the disclosure, the term 'memory 140' may be used as a meaning that includes the memory 140, a read only memory (ROM; not shown) in the processor 130, a random access memory (RAM; not shown), or a memory card (not shown; e.g., a micro SD card, a memory stick) mounted to the electronic device 100.

Meanwhile, the memory 140 may be stored with data associated with the electronic device 100. For example, the memory 140 may store the Bluetooth paired list that includes information on the device that was connected with the electronic device 100 through the first communication interface 110.

The input interface 150 may include circuitry. The input interface 150 may receive the user input. For example, the input interface 150 may be configured with a plurality of buttons. In another example, the input interface 150 may receive a remote controller signal from a remote controller for controlling the electronic device 100. In another example, the input interface 150 may be implemented with a touch screen. In this case, the processor 130 may perform, based on a user input being received through the input interface 150, an operation corresponding to the user input.

The display 160 may display an image. Specifically, the processor 130 may output various images through the display 160. For example, the processor 130 may display a UI for connection with the wearable device 160 on the display 160. To this end, the display 160 may be implemented as devices of various types such as, for example, and without limitation, an LCD, an LED, an OLED, or the like.

The speaker 170 may output audio. Specifically, the processor 130 may output various notification sounds or voice guidance messages associated with an operation of the electronic device 100 through the speaker 170. For example, the processor 130 may output a voice or audio for connection with the wearable device 200 through the speaker.

Figure 9:
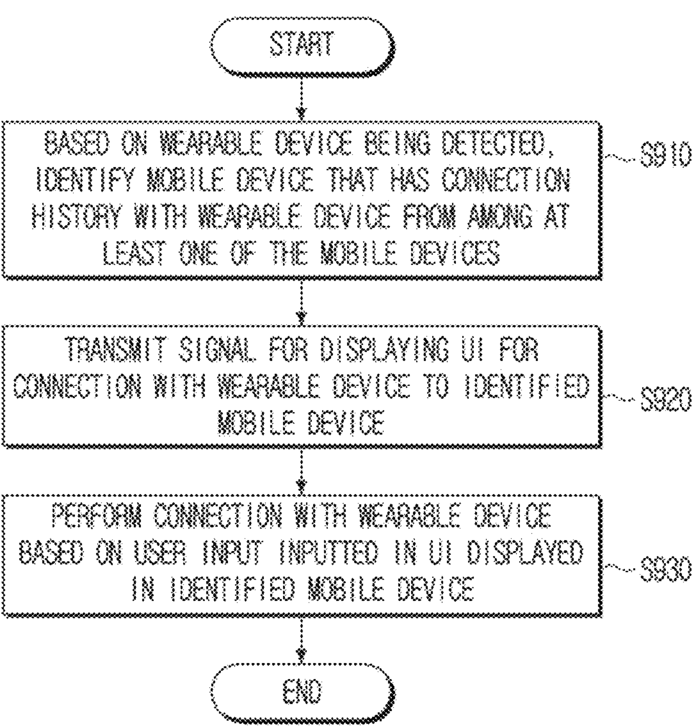
FIG. 9 is a flowchart illustrating a connection method of an electronic device according to some embodiments of the disclosure.

FIG. 9 is a flowchart illustrating a connection method of an electronic device according to some embodiments of the disclosure.

First, when a wearable device is detected, the mobile device that has the connection history with the wearable device may be identified from among the at least one of the mobile devices (S910).

Then, a signal for displaying a UI for connection with the wearable device may be transmitted to the identified mobile device (S920).

Further, based on the user input inputted in the UI that is displayed in the identified mobile device, perform connection between the electronic device with the wearable device (S930).

Specifically, step S910 describes of receiving information on the wearable device that was connected to the at least one mobile device from the at least one mobile device, and identifying the mobile device that has the connection history with the wearable device from among the at least one of the mobile devices based on information on the wearable device received from the wearable device and information on the wearable device received from the at least one of the mobile devices.

In addition, step 920 describes of transmitting, based on there being no connection history between the electronic device and the wearable device, a signal for displaying a UI for performing the connection process between the electronic device and the wearable device to the identified mobile device.

In this case, step S930 describes of performing, based on the user input inputted in the mobile device identified through the UI being received from the identified mobile device, connection with the wearable device according to the received user input.

Meanwhile, step S920 describes of transmitting, based on there being the connection history between the electronic device and the wearable device, the signal for displaying the UI for receiving confirmation as to whether to connect the wearable device to the electronic device to the identified mobile device.

In this case, step S930 describes of performing, based on the user input inputted in the mobile device identified through the UI being received from the identified mobile device, connection with the wearable device according to the received user input.

Meanwhile, step S930 describes of performing connection with the wearable device using the Bluetooth method.

Meanwhile, according to some embodiments, a method according to the embodiments of the disclosure may be provided included a computer program product. The computer program product may be exchanged between a seller and a purchaser as a commodity. The computer program product may be distributed in a form of a machine-readable storage medium (e.g., a compact disc read only memory (CD-ROM)), or distributed (e.g., downloaded or uploaded) online through an application store (e.g., PLAYSTORE™) or directly between two user devices (e.g., smartphones). In the case of online distribution, at least a portion of the computer program product (e.g., downloadable app) may be stored at least temporarily in the machine-readable storage medium such as a server of a manufacturer, a server of an application store, or a memory of a relay server, or temporarily generated.

Each of the elements (e.g., a module or a program) according to the various embodiments of the disclosure as described above may be configured as a single entity or a plurality of entities, and some sub-elements of the above-mentioned sub-elements may be omitted, or other sub-elements may be further included in the various embodiments. Alternatively or additionally, a portion of the elements (e.g., modules or programs) may be integrated into one entity to perform the same or similar functions performed by the respective elements prior to integration.

Operations performed by a module, a program, or another element, in accordance with various embodiments, may be executed sequentially, in a parallel, repetitively, or in a heuristic manner, or at least a portion of the operations may be executed in a different order, omitted or a different operation may be added.

The term “part” or “module” used in the disclosure may include a unit configured of a hardware, software, or firmware, and may be used interchangeably with terms such as, for example, and without limitation, logic, logic blocks, components, circuitry, or the like. “Part” or “module” may be a component integrally configured or a minimum unit or a part of the component performing one or more functions. For example, a module may be configured as an application-specific integrated circuit (ASIC).

Meanwhile, a non-transitory computer-readable medium stored with a program that sequentially performs a control method according to the disclosure may be provided. The non-transitory computer-readable medium may refer to a medium that stores data semi-permanently rather than storing data for a very short time, such as a register, a cache, a memory, or the like, and is readable by a device. Specifically, the various applications or programs described above may be provided stored in the non-transitory computer-readable medium such as, for example, and without limitation, a compact disc (CD), a digital versatile disc (DVD), a hard disc, a Blu-ray disc, a USB, a memory card, a ROM, and the like.

In addition, some embodiments of the disclosure may be implemented with software including instructions stored in a machine-readable storage media (e.g., computer). The machine may call a stored instruction from the storage medium, and as a device operable according to the called instruction, may include an electronic device (e.g., robot (100)) according to the embodiments described above.

Based on the instruction being executed by the processor, the processor may directly or using other elements under the control of the processor perform a function corresponding to the command. The instruction may include a code generated by a compiler or executed by an interpreter.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. An electronic device, comprising:

a first communication interface;

a second communication interface; and one or more processors configured to:

identify, based on a wearable device being detected by the one or more processors through the first communication interface, a device having a connection history with the wearable device from among at least one of one or more devices;

transmit a control command to the identified device through the second communication interface, the control command comprising a command for displaying a user interface (UI) for connection with the wearable device; and control, based on a user input inputted in the UI displayed in the identified device, the first communication interface to connect to the wearable device.

2. The electronic device of claim 1, wherein the one or more processors are further configured to:

receive information on a wearable device that was connected to the at least one of the one or more devices through the second communication interface; and identify, based on information on the wearable device received from the wearable device through the first communication interface and information on the wearable device received from the at least one of the one or more devices through the second communication interface, the device having the connection history with the wearable device from among the one or more devices.

3. The electronic device of claim 1, wherein the one or more processors are further configured to transmit a control command for displaying a UI for performing a connection process between the electronic device and the wearable device to the identified device in a state in which the connection history does not exist between the electronic device and the wearable device.

4. The electronic device of claim 3, wherein the one or more processors are further configured to control, based on the user input inputted in the identified device through the UI being received from the identified device through the second communication interface, the first communication interface to connect to the wearable device according to the received user input.

5. The electronic device of claim 1, wherein the one or more processors are further configured to transmit a control command for displaying a UI for receiving confirmation on whether to connect the wearable device to the electronic device to the identified device in a state in which the connection history exists between the electronic device and the wearable device.

6. The electronic device of claim 5, wherein the one or more processors are further configured to control, based on the user input inputted in the identified device through the UI being received from the identified device through the second communication interface, the first communication interface to connect to the wearable device according to the received user input.

7. The electronic device of claim 1, wherein the one or more processors are further configured to control the first communication interface to connect to the wearable device via Bluetooth™.

8. A connection method of an electronic device, the method comprising:

identifying, based on a wearable device being detected, a device that has a connection history with the wearable device from among at least one of one or more mobile devices;

transmitting a control command for displaying a user interface (UI) for connection with the wearable device to the identified device; and connecting, based on a user input inputted in the UI displayed in the identified device, the electronic device to the wearable device.

9. The method of claim 8, wherein the identifying comprises:

receiving information on a wearable device that has been connected to the one or more devices from the one or more devices; and identifying, based on information on the wearable device received from the wearable device and information on the wearable device received from the at least one of the one or more devices, the device that has the connection history with the wearable device from among the one or more devices.

10. The method of claim 8, wherein the transmitting comprises transmitting a control command for displaying a UI for performing a connection process between the electronic device and the wearable device to the identified device in a state in which the connection history does not exist between the electronic device and the wearable device.

11. The method of claim 10, wherein the connecting comprises connecting, based on the user input inputted in the identified device through the UI being received from the identified device, the electronic device to the wearable device according to the received user input.

12. The method of claim 8, wherein the transmitting comprises transmitting a control command for displaying a UI for receiving confirmation on whether to connect the wearable device to the electronic device to the identified device in a state in which the connection history exists between the electronic device and the wearable device.

13. The method of claim 12, wherein the connecting comprises connecting, based on the user input inputted in the identified mobile device through the UI being received from the identified device, with the electronic device to the wearable device according to the received user input.

14. The method of claim 8, wherein the connecting comprises connecting the electronic device to the wearable device via Bluetooth™.

15. A non-transitory computer readable recording medium storing computer instructions that cause an electronic device to perform an operation when executed by one or more processor of the electronic device, wherein the operation comprises;

identifying, based on a wearable device being detected, a device that has a connection history with the wearable device from among at least one of one or more mobile devices;

transmitting a control command for displaying a user interface (UI) for connection with the wearable device to the identified device; and connecting, based on a user input inputted in the UI displayed in the identified device, the electronic device to the wearable device.

16. The medium of claim 15, wherein the identifying comprises:

receiving information on a wearable device that has been connected to the one or more devices from the one or more devices; and identifying, based on information on the wearable device received from the wearable device and information on the wearable device received from the at least one of the one or more devices, the device that has the connection history with the wearable device from among the one or more devices.

17. The medium of claim 15, wherein the transmitting comprises transmitting a control command for displaying a UI for performing a connection process between the electronic device and the wearable device to the identified device in a state in which the connection history does not exist between the electronic device and the wearable device.

18. The medium of claim 17, wherein the connecting comprises connecting, based on the user input inputted in the identified device through the UI being received from the identified device, the electronic device to the wearable device according to the received user input.

19. The medium of claim 15, wherein the transmitting comprises transmitting a control command for displaying a UI for receiving confirmation on whether to connect the wearable device to the electronic device to the identified device in a state in which the connection history exists between the electronic device and the wearable device.

20. The medium of claim 19, wherein the connecting comprises connecting, based on the user input inputted in the identified mobile device through the UI being received from the identified device, with the electronic device to the wearable device according to the received user input.

* * * * *